Figure 1:
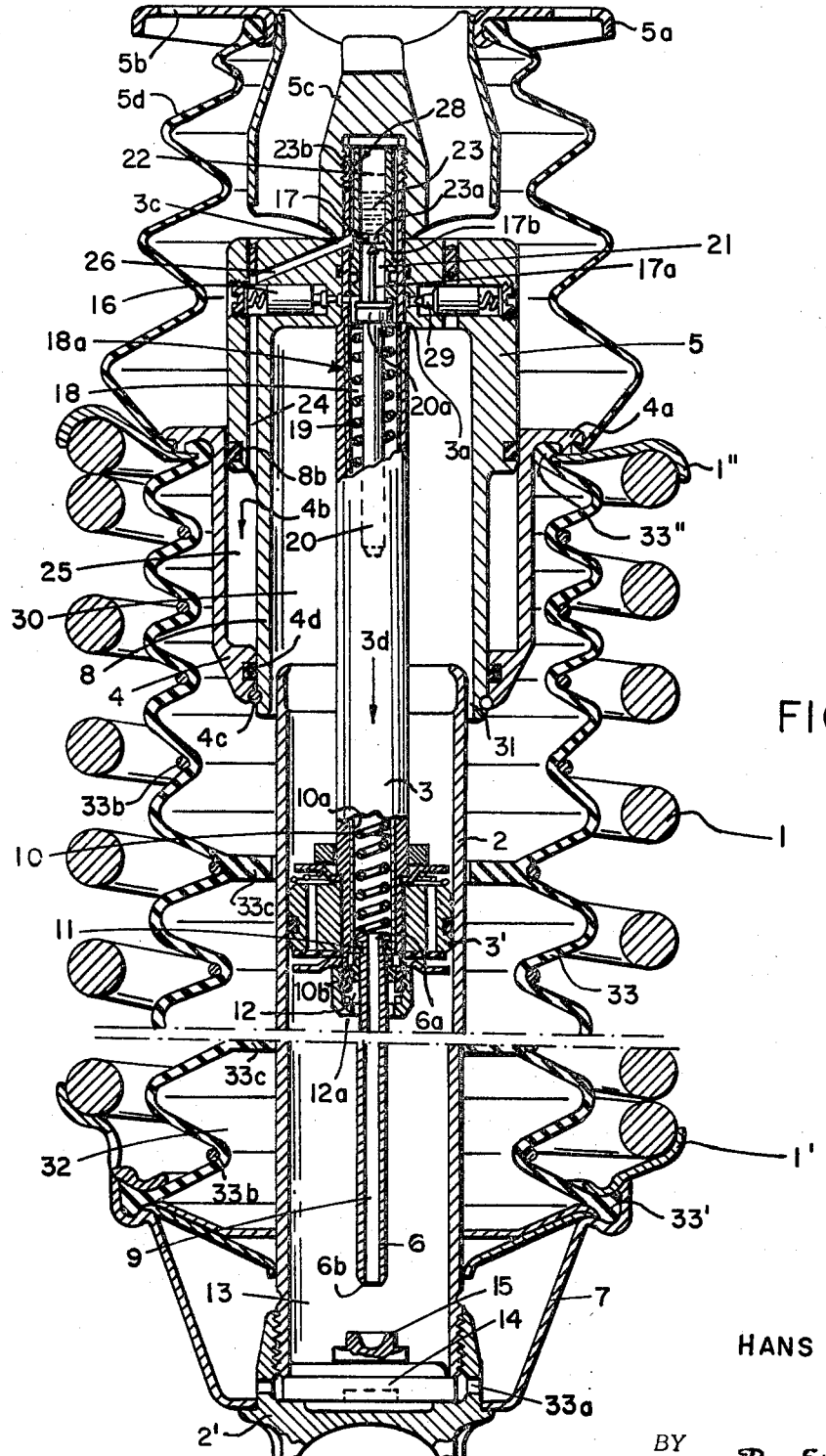

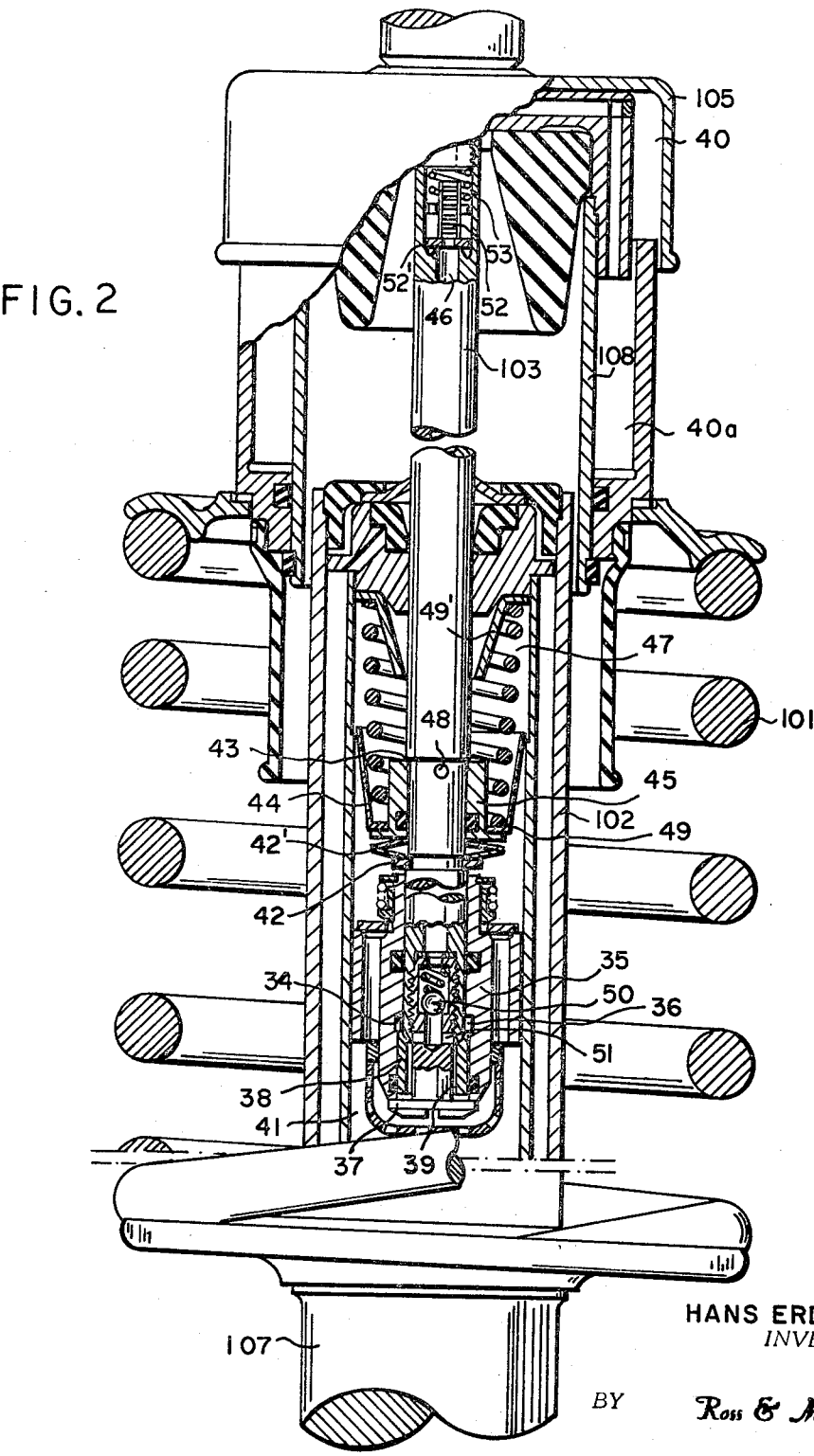

United States Patent Office 3,385,589
Patented May 28, 1968

3,385,589
VEHICULAR SUSPENSION SYSTEM
Hans Erdmann, Frankfurt am Main, Germany, assignor to Alfred Teves KG., Frankfurt am Main, Germany, a corporation of Germany
Filed June 13, 1966, Ser. No. 557,220
Claims priority, application Germany, June 30, 1965, T 28,909
10 Claims. (Cl. 267—34)

My present invention relates to a vehicular suspension system and, more particularly, to a shock absorber for such a system which constitutes an improvement over the shock-absorber device described and claimed in the commonly assigned copending application Ser. No. 500,574, filed Oct. 22, 1965 by me and Leopold F. Schmidt, and entitled Shock Absorber for Vehicular Suspension Systems, now Patent No. 3,353,813.

In the aforementioned copending application, it has been pointed out that piston-and-cylinder arrangements have been provided heretofore in vehicular shock absorbers for displacement, as a dash-pot assembly, against the frictional resistance of a hydraulic fluid and against the restoring force of one or more biasing springs. As noted in that application, such shock absorbers have been provided in conventional suspensions with the spring surrounding the cylinder and seated against one of the dash-pot members or coupled therewith at one end while bearing upon the other of the dash-pot members at its other end. The cushioning effect of such a system depends upon the stiffness of the springs employed so that, with relatively short and stiff springs, impacts are transmitted within sufficient attenuation and a hard ride results, especially in the case of a partially loaded vehicle whose springs are designed to sustain the full load capacity of the vehicle and thus are not generally in an optimum resonance condition with respect to the load. Use of longer and softer springs, on the other hand, is often prevented by spatial considerations and is disadvantageous in that relatively long springs are compressed to a considerable extent under loading and thus vary substantially the loaded height of the vehicle body above the axle and ground, thereby effecting the headlight-beam height and detrimentally changing the location of the center of gravity to a marked degree.

In the copending application mentioned above, however, these advantages can be avoided by the provision, in a resiliently biased dash-pot assembly, of supplemental fluid-pressure responsive means for reinforcing the restoring action of the coil or other biasing spring; advantageously, this supplemental fluid-pressure-responsive means is operatively coupled with one of the members of the dash-pot assembly for joint displacement therewith. Such means can include, for example, a hydraulic motor having a movable element rigidly connected with one of the anchors or seats of the biasing spring so as to increase the stress applied to that spring, i.e., to compress it further in the case of an extending coil spring, upon increase in the load. The return of fluid from the hydraulic motor to the supplemental fluid-pressure-responsive means, i.e., to a chamber enclosing an auxiliary plunger, can be formed as a loosely fitted thread on the exterior of a tubular insert whose central bore forms part of the forward path for the fluid and advantageously contains a check valve to prevent a return flow through that bore.

Thus, in its essentials, the improved shock absorber or suspension device of the copending application can include a coil spring surrounding a fluid-responsive shock damper of the piston-and-cylinder type. Such an arrangement, generally termed a "direct-action" shock absorber, is provided at one extremity with load-leveling means designed to vary the distance between the corresponding member of the vehicle assembly (i.e., vehicle chassis or body member and axle member) and the corresponding extremity of the coil spring by displacing the seat of the latter away from this vehicle member with the aid of a pumping action by means of which hydraulic fluid is forced into the fluid-responsive load-leveling means. When reference is made hereinafter to such "load-leveling means," it will be understood that the expression is designed to identify a system in which hydraulic means displaces the seat of the suspension spring away from the corresponding vehicle member with increase in the load and thereby further loads or compresses the spring and correspondingly elevates the vehicle body to a predetermined height. In the arrangement of the copending application, a hydraulic cylinder was slidably mounted upon the piston rod and co-operated with a piston mounted upon the vehicle body member or chassis and received in the cylinder. In the bottom of the shock damper, means were provided in the form of a pumping plunger to displace fluid to the piston and cylinder of the spring-stressing or load-leveling means.

It is the main object of the present invention to extend the principles originally set forth in the copending application identified above to other, and improved, suspension devices of greater structural simplicity and increased operating efficiency.

A further object of this invention is to provide an improved direct-action shock absorber with load-positioning ability for disposition between members of a vehicle assembly, the shock absorber being of relatively compact construction, having excellent shock-damping characteristics, and being free from the tendency to disorder characterizing earlier shock-absorber arrangements.

These objects and others which will become apparent hereinafter, are attained, in accordance with the present invention, by the provision of the supplemental fluid-responsive means, i.e., a body-lifting hydraulic jack or elevating means, as an annular cylinder concentrically or co-axially surrounding the shock absorber shell. I have found that such an arrangement permits a marked reduction in the length of the shock-absorber assembly by eliminating completely the added length of the body-lifting hydraulic means and permits a substantial reduction in the length of the shock absorber to be obtained. It will be understood that the length of a shock absorber is highly material to its suitability since excessive length prevents the device from being adequately used in modern, low-hung suspensions.

According to a more specific feature of the present invention, the hydraulic fluid for charging the body-lifting cylinder can be forced into the latter by means of a pumping device of the type described in the above-mentioned copending application; thus the piston rod of the shock-damping arrangement can be made tubular and provided in its interior with a sleeve or bushing in which a pumping plunger is guided. The plunger can, in turn, co-operate with a foot-type check valve at one end of the tubular body while its other end is provided with a longitudinal bore communicating with the pump chamber and a transverse bore opening into the longitudinal bore. The transverse bore is so disposed that, upon loading the vehicle, the transverse bore is shifted into the bushing to close the longitudinal bore while, upon unloading of the vehicle and relaxation of the compression spring, the transverse bore is withdrawn from the bushing and opens a fluid passage when the normal vehicle-body level is attained or exceeded.

In another embodiment of the instant invention, a pump plunger provided with a thoroughgoing longitudinal bore can be provided within the shock-absorber piston rod, a sealing means and a guide means being carried by the plunger to facilitate sliding and pumping movement of the plunger therein. The plunger can then co-operate with a seal fixedly disposed at the end of the cylinder confronting the free extremity of the piston rod for closing the longitudinal bore and permitting the pumping chamber to be compressed upon loading of the vehicle body so that the sliding movement of the plunger within the piston rod forces the fluid into the body-lifting hydraulic cylinder. The charging and discharging of this latter cylinder can be controlled by respective independent valve; in this case, the charging of this cylinder can be effected by means of a bushing slidable upon the shock-absorber piston rod between axially spaced abutments or stops. The bushing or valve sleeve can then constitute a differential-piston pump which selectively opens a fluid passage into the hydraulic body-lifting means and forces fluid thereto from the shock-damper chamber. This latter arrangement has the advantage that a well-defined pumping chamber is provided whose displacement is independent of the oscillation amplitude of the shock absorber so that, for example during travel along poor roads, and inordinately large volume of fluid will not be displaced to the hydraulic jack. The discharge of fluid from the hydraulic body-elevating jack is carried out via another valve. Thus the filling of the pumping chamber with spent fluid from the body-lifting cylinder is avoided.

The above and other objects, features and advantages of the present invention will become more readily apparent from the following description, reference being made to the accompanying drawing in which:

FIG. 1 is an axial cross-sectional view of a direct-action load-leveling vehicle shock absorber in accordance with this invention; and FIG. 2 is a corresponding axial cross-sectional view through another shock absorber embodiment of the instant invention.

In FIG. 1, I show a direct-action shock absorber which comprises a coil-type suspension spring 1 seated against a spring plate 1' at the lower end of the shock absorber and a further plate 1" at the upper end and pre-compressible between these plates. The shock damper comprises essentialy a dash-pot type piston-and-cylinder arrangement whose cylinder 2 is threaded onto a connecting lug 2' at the lower end of the device, this lug serving to attach the shock absorber pivotally to one of the members of the vehicle assembly, usually the axle member. The fluid cylinder 2 slidably receives a piston 3' of the shock damper which is provided with throttle bores and valve means by means of which fluid can pass from one side of the piston 3' to the other upon reciprocation of the piston 3 to damp such reciprocation in the manner of a conventional dash-pot and as described in greater detail in the copending application mentioned above. It will be understood that the cylinder 2 and piston 3' thus constitute, together with the suspension spring 1, a hydraulic shock-damping system designed to reduce oscillations of the vehicle body, which is supported upon the shock absorber, while cushioning the transmission of road-induced shocks or movements thereto.

The piston 3' is carried by a piston rod 3 extending coaxially within the cylinder 2 and provided on its outer extremity with a hydraulic jack or body-lifting mechanism designed to elevate the vehicle body with respect to the plate or seat 1" of the suspension spring 1. This supplemental fluid-responsive mechanism comprises an annular cylinder 4 surrounding the shock-damper cylinder 2 and shiftable axially therealong and telescopingly receiving same. The body-elevating means further includes a piston 5 received in the cylinder 4 and also coaxial with the cylinder 2 and the piston rod 3 while shiftable with respect to the cylinder 2 but anchored to the rod 3. The piston 5 is connected to the vehicle body or chassis by means of a flange 5a, extending transversely to the axis of the cylinders 2 and 4 and provided with a plurality of bores 5b through which connecting bolts (not shown) can pass to join the flange 5a to the vehicle body. The hub 5c of this flange 5a is threaded onto the upper extremity of the piston rod 3 and serves to clamp the piston 5 against a shoulder 3a of this piston rod so that piston rod 3, piston 5 and flange 5a are all anchored together to the vehicle body. A tubular pump plunger 6 is axially shiftable in and coaxially carried by the piston rod 3, while extending from its lower extremity for engagement with the bottom end or floor of the cylinder 2; thus the plunger 6 reciprocates within the piston rod 3 to pump hydraulic fluid into the expandable chamber 25 defined between the cylinder 4 and the piston 5. Thus the plunger 6 co-operates with the hydraulic jack 4, 5 to raise the level of the vehicle body. For this purpose, the cylinder 4 has a flange 4a against which the spring seat 1" bears so that axial movement of the cylinder 4 in the direction of arow 4b will stress the spring 1 between its seats 1' and 2'. The seat 1' rests against a hydraulic-fluid reservoir 7 mounted upon the lug 2'. Advantageously, the shock damper also includes a cylindrical sleeve 8 telescopingly receiving the cylinder 2 and surrounded by the annular cylinder 4 to define the annular compartment 25 therewith, the sleeve 8 being integral with the piston 5 and enclosing the free extremity of the piston rod 3. By providing the auxiliary fluid-responsive body-elevating means 4, 5 upon the sleeve 8, a substantial reduction in the axial length of the shock absorber can be obtained.

In the system of FIG. 1, the plunger 6 is formed with a throughgoing axially extending bore 9 which opens into an axial bore 10 of the piston rod 3. The head 6a of plunger 6 is provided with sealing rings 11 facilitating the axial displacement of the plunger 6 within the pumping cylinder formed by the bore 10; a packing ring 12 is clamped around the periphery of the plunger 6 by a packing nut 12a and seals the plunger 6 without interference with the axial movement of the plunger 6 within the piston rod 3. Ring 11 serves as a guide for the plunger 6 within the bore 10 while ring 12 prevents leakage of displaced fluid into or out of the bore 10 upon reciprocation of the plunger 6. A foot-type check valve 14 is provided below the plunger 6 and has a collar 15 in the form of a sealing boss 15 engageable by the complementarily shaped end 6b when the latter is thrust against the member 15 during reciprocation of the dash-pot. When plunger 6 bears against the sealing collar 15, this bore 9 is closed to permit fluid displacement through the interior of the piston rod and into the hydraulic assembly 4, 5. Other sealing arrangements having this end also can be employed, e.g. the provision of a slidable sleeve on the plunger 6 adapted to block a radial bore communicating between the cylinder chamber 13 and the interior of the plunger 6 when such sleeve is brought to bear against the foot valve 14. The latter may be of the type commonly used in the master cylinders of hydraulic brake systems.

To control the flow of fluid between the pumping mechanism 6, 10, 11, etc. and the hydraulic jack 4, 5, etc., I provide at the head of the shock-damper sleeve 8 a valve arrangement including a check valve 16 and a selectively closable valve assembly 17. More specifically, the bore 10 of the piston rod 3 is provided within a tube 10a in which the head 6a of plunger 6 is movable against the force of a captive compression spring 19, the tube 10a being closed by a ring 10b at its lower extremity. The clearance 18 of the guide tube 10a receives the coil spring 19 which extends substantially along the full length of this tube and bears upon a pin 20 at its shoulder 20a. Fluid flow through the tube 10a is permitted by the bores 18 and 18a. The pin 20, moreover, carries a conical valve member 17a of the valve means 17, this valve member 17a extending axially through a chamber 21 forwardly of the shoulder 20a. The conical tip 17b of valve member 17a co-operates with a valve seat 23a axially aligned with the valve member 17a and integrally formed in a tubular valve body 23 which forms a throttle clearance 23b between itself and the tubular piston rod 3 and is provided with a screen 22 to prevent entry of contaminants to the throttle-valve structure 17 and throttle the efflux of hydraulic fluid from the interor of this piston rod. The interior of the tubular insert 23 communicates via the clearance 23b and a radial throttle bore 3c in the piston rod 3 with a passage 26 in the piston member 5, 8 which, in turn, opens into a further channel 24 communicating with the working chamber 25 of the hydraulic body-lifting mechanism. The bore 3c, the clearance 23b and the throttle-valve assembly 17, etc. constitute a cascade throttling arrangement. Upon loading of the vehicle body with consequent movement of the flange 5a toward the lug 2', the pump plunger 6 seats itself against the sealing cuff 15 to close the pumping chamber defined by the bores 9 and 10. Upon further relative movement of the piston rod 3 with respect to the lug 2' and the cylinder 2 during the compressing operation upon normal movement of the vehicle, the plunger 6 slides axially into the piston rod 3 to displace the fluid therein while closing the valve 17 and force the fluid past the check valve 16 into the bore 24 and thus into the working chamber 25. Repeated reciprocation of the plunger 6 with its extremity 6b closed, effects the pumping action required to displace the fluid as described in the aforementioned copending application and thereby expand the chamber 25 by raising the flange 5a and the vehicle body affixed thereto with respect to the spring seat 1" and thus with respect to the lug 2'. The end 6b of the plunger 6, however, is lifted from the seal 15 repeatedly during such reciprocation under normal road movement and oscillation of the vehicle body to permit additional quantities of fluid from the damper chamber 13 to enter the pump and supply the working chamber 25. Normal shock-absorber action is obtained by the dash-pot piston 3'. The pumping action continues as long as the plunger 6 repeatedly engages the sealing collar 13. When the body of the vehicle is raised sufficiently to withdraw the plunger 6 from the collar 15 and prevent its repeated contact therewith, no further fluid is pumped into the chamber 25 and the vehicle body remains at the pre-established desired height.

Upon unloading of the vehicle, the spring 19 urges the plunger 6 downwardly although it cannot engage the seal 15 so that the fluid pressure in chamber 10 relaxed permit the valve member 17 to move into the position illustrated in FIG. 1 and thereby permit hydraulic fluid to be forced under the load of the vehicle body from chamber 25 via the bore 24 and the passage 26 with a throttling action through the clearance 23b, the interior of tubular insert 23 and the valve seat 23a into the chamber 13 through the bores 18, 18a, the piston rod 3 and the bore 9. The level of the vehicle body is thus permitted to fall to its predetermined normal level again. When the relaxation condition exceeds the desired amplitude, the piston 6 again engages the seat 15 and further return flow blocked or the pumping action recommenced. Thus when the vehicle is in a stationary condition, the body level lowers only until the plunger 6 is reseated upon the seat 15, thereby blocking further escape through the interior of this plunger.

It has been found to be advantageous to connect the valve chamber 21 with a pressure-relief valve 29 which communicates with the chamber 30 of the sleeve 8 and permits, with the development of sudden load, fluid to be bypassed to the chamber 13a above the damper piston 3'. Any excess fluid passes via the clearance 31 into the chamber 32 defined by a protective sleeve 33 of flexible material from which the fluid can be delivered via a bore 33a to the chamber 13 past the foot valve 14. The sleeve 33 has annular ridges 33' and 33" respectively sealingly held by seats 1' and 1" against respective flanges 7' of the reservoir 7 and 4a of the cylinder 4. Circular wires 33b are received within troughs of the annular corrugations of the protective sleeve 33 to reinforce the latter and prevent deformation thereof except in axial direction. At spaced locations along the sleeve 33 and for further reinforcement, transverse flanges 33c are integrally provided and extend inwardly to define annular clearances with the cylinder 2. A spring ring 4c is received within a groove of the sleeve 8 at its lower extremity to form a stop for the cylinder member 4 while an annular seal 4d provide a fluid-tight connection between the cylinder 4 and the outer wall of the sleeve 8. Furthermore, a seal 8b is seated in the piston portion 5 of this sleeve 8 to provide a fluid-tight connection between the cylinder 4 and the piston at the upper end of the chamber 25. A dust shield or collar 5d is disposed between the flange 5a and the flange 4a to prevent entry of dust and other contaminants into the hydraulic body-lifting mechanism 4, 5, etc. The check valve 14 is of the type generally provided in hydraulic-brake master cylinders and permits the flow of fluid from the reservoir 7 via the bore 33a into the damper chamber 13 upon an upstroke of the piston 33' by virtue of a pressure differential in this direction across the foot valve. Fluid flow past the check valve in the opposite direction is barred.

In the embodiment of FIG. 2, parts corresponding to those of FIG. 1 are designated with the same numerals but with "hundreds" indications and, where not illustrated, have the construction of FIG. 1. In the system of this embodiment, the charging of the working chamber of the body-lifting cylinder and its depressurization or draining is effected by independent valve means. In this case, the charging of the body-lifting cylinder 104 with hydraulic fluid is effected via a piston rod provided with a shock-damping piston 35 and defining therewith a pumping chamber 34 around the piston rod and within the shock-damping piston 35. The piston 35 is reciprocable upon the rod between stops 36 and 37 axially spaced therealong upon a slide-bearing body or sleeve 38. The latter is axially shiftable within the piston 35 and comprises a differential piston pump. Thus, the bushing 35 can be considered a pump plunger and an annular clearance is provided at 39 to connect the shock-damping chamber 41 with the pumping chamber 34 which, in turn, communicates with the working chamber 40, 40a of the body-lifting hydraulic arrangement 104, 105.

The fluid-return valve is formed by a valve sleeve 45 which is axially shiftable upon the piston rod 103 between a pair of axially spaced stops 42 and 43 by the action of a coil spring 44 adapted to urge this valve sleeve 45 downwardly (FIG. 2) into an extreme position against the stop 42. A dished-disk spring 42' is interposed between the stop 42 and the sleeve 45 to cushion the downward movement of this sleeve. The sleeve 45 is adapted to open and close a radial bore 46 in the piston rod 103 communicating between the central bore 46 thereof and the shock-absorber chamber 47. A spring holder 49 engages the inner wall of the cylinder 102 to constitute with a spring seat 49' at the other end of the spring 44 a spring-enclosing cage similar to the cage formed by the tube 10a and adapted to limit the axial elongation of the coil spring 34. During the suspension-stressing stroke of the system, i.e. with loading of the vehicle connecting means 107 joining the shock absorber with the axle assembly, the fluid pressure in chamber 41 causes the shock-damper piston 35 to seat against the stop 42 and thus be entrained by the piston rod 103 and, thereby, to entrain the pumping plunger 38 in this direction. The bushing or plunger 38 is then withdrawn from its stop 37 and permits communication between the shock-damper chamber 41 and the pump chamber 34 via the annular clearance 39 between the plunger 38 and the piston rod 103. The pump chamber 34 is filled with hydraulic fluid and with reciprocation of the piston rod 103 and differential movement of the sleeve 38, displaces this fluid past the check valve 50 through the central bore 46 of the piston rod 103 into the working chambers 40 and 40a of the piston-and-cylinder arrangement 104, 105. During this stroke of the piston rod 103, the port 48 is blocked via the sleeve 45. Upon relaxation of the load or a raising of the vehicle body with respect to the axle assembly, a pressure excess developes in the shock-damper chamber 47 to shift the piston 35 downwardly upon the piston rod 103, thereby entraining the plunger 38 at the annular stop 37 to close the annular clearance 49. Upon further downward movement of the piston rod 103 with respect to the reservoir 107, the hydraulic fluid in chamber 34 is compressed past the check valve 50 as indicated earlier and pumper to the working chambers 40 and 40a to raise the vehicle body. Excessive upward movement of the piston rod 103, however, causes the spring 44 to urge the slide 45 to the right and unblock the port 48, thereby permitting the chambers 40 and 40a to drain into the damper chamber 47. The device is provided with a throttle 52 in cascade with the valve 50 and adapted, therefore, to restrict the rate of fluid flow to and from the chamber 40, 40a. The cascade throttle 52 is biased by a spring 53 to block the passage 46 unless sufficient pressure to overcome the spring force 53 is provided in the direction of filling of chambers 40 and 48. The return flow passes through the throttle ports of the plate 52' even in its closed position. The valve sleeve 45 is withdrawn from its seat 43 upon unloading of the vehicle body only sufficiently to permit the spacing of the connecting eyes at the opposite ends of the shock absorber to reattain its desired value, whereupon the spring 44 is no longer effective and sleeve 45 closes the port 48. It will be understood, of course, that the settling of the vehicle body caused the piston rod 103 to move downwardly and that it is this movement relative to the valve sleeve 45 which effects the valve-closing operation.

The invention described and illustrated is believed to admit of many modifications within the ability of persons skilled in the art, all such modifications being considered within the spirit and scope of the appended claims.

I claim:

1. In a body-level-adjusting, shock-damping vehicle suspension system having a shock absorber interposed between an axle portion and a body portion of a vehicle and having hydraulic shock-damping means for reducing relative oscillatory movement of said portions, suspension-spring means extending along said shock-damping means for urging said portions apart, and hydraulic body-elevating means interposed between one of said portions and said spring means for loading said spring means and adjusting the level of said body portion relatively to said axle portion thereby to maintain the level of said body portion under loading thereof, the improvement wherein:

said shock-damping means includes a first hydraulic cylinder, and a first hydraulic piston reciprocable within said cylinder to form a dash-pot assembly therewith; and said body-elevating means includes a second hydraulic cylinder coaxially surrounding said first cylinder at least at one end thereof and telescopingly receiving said first cylinder, a second hydraulic piston received in said second cylinder, and pump means for supplying said second cylinder with hydraulic fluid upon reciprocation of said dash-pot assembly.

2. The improvement defined in claim 1 wherein said first piston is tubular and said pump means includes an elongated pump plunger slidably mounted in said first piston, said plunger having an axially extending through-going bore adapted to communicate between said first cylinder and the interior of said first piston, said first piston communicating with said second cylinder for the delivery of hydraulic fluid thereto, said plunger extending from said first piston in the direction of the other end of said first cylinder, said first cylinder having at said other end seal means co-operating with said plunger to block said bore upon movement of said first piston in the direction of said other end, thereby displacing fluid from the interior of said first piston upon further movement of said first piston towards said other end with said plunger immobilized by said seal means.

3. The improvement defined in claim 2, further comprising a reservoir of hydraulic fluid communicating with said first cylinder at that other end, and a foot-type check valve interposed between said reservoir and the interior of said first cylinder, said seal means being mounted upon said check valve.

4. The improvement defined in claim 2 wherein said first and second pistons are anchored together for joint movement, further comprising a check valve interposed between the interior of said second cylinder and the interior of said first piston for admitting hydraulic fluid from the latter to said second cylinder while blocking the reverse flow of fluid therefrom, and throttle-valve means communicating between said second cylinder and the interior of said first piston for permitting a restricted flow of fluid from said second cylinder to said first cylinder through said first piston while said body portion disposed above a predetermined body level but blocking the flow of fluid from said second cylinder upon the lowering of said body portion to said predetermined level.

5. The improvement defined in claim 4 wherein said throttle means includes a guide tube received within said first piston, a spring in said guide tube bearing upon said plunger, a valve member having a shank portion extending into said guide tube and engaged by said spring for biasing into valve-closing position, said tube being provided with a passage for said fluid.

6. The improvement defined in claim 5 wherein said throttle-valve means includes a valve chamber and screen means interposed between said valve chamber and said second cylinder, said chamber being defined by a sleeve forming a throttle passage in cascade with said chamber.

7. The improvement defined in claim 1, further comprising a charging valve and a discharging valve operable independently of one another and interposed between said cylinders for respectively controlling the charging and discharging of said second cylinder.

8. The improvement defined in claim 1 wherein said first piston is tubular and communicates with said second cylinder, said pump means comprising means defining an annular pump chamber surrounding said first piston and communicating with the interior thereof, a sleeve axially shiftable on said first piston and cooperating with said chamber for displacing fluid therefrom to said second cylinder through the interior of said first piston, and abutment means on said first piston for limiting the stroke of said sleeve, said sleeve forming a differential-piston pump member reciprocable within said chamber.

9. The improvement defined in claim 8, further comprising check-valve means within said first piston for admitting fluid from said chamber into said interior thereof while blocking outflow of fluid from said second cylinder into said chamber.

10. The improvement defined in claim 9 wherein said first piston is provided with a radial bore spaced from said sleeve communicating between said first cylinder and the interior of said first piston for draining fluid from said second cylinder, and a valve sleeve axially shiftable on said first piston and operative to unblock said bore in a position of said body portion above a predetermined level to discharge fluid from said body-elevating means and to block said bore upon said body portion returning to said predetermined level.

References Cited

UNITED STATES PATENTS 3,331,599   7/1967   Polhemus et al. _____ 267—34

DUANE A. REGER, *Primary Examiner.*